US010297825B2

United States Patent
Ryoshi et al.

(10) Patent No.: US 10,297,825 B2
(45) Date of Patent: May 21, 2019

(54) PROCESS FOR PRODUCING NICKEL COBALT ALUMINUM COMPOSITE HYDROXIDE AND PROCESS FOR PRODUCING POSITIVE ELECTRODE ACTIVE MATERIAL FOR NON-AQUEOUS ELECTROLYTE SECONDARY BATTERIES

(71) Applicant: SUMITOMO METAL MINING CO., LTD., Tokyo (JP)

(72) Inventors: Kazuomi Ryoshi, Ehime (JP); Koji Yamaji, Ehime (JP); Kensaku Mori, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 81 days.

(21) Appl. No.: 15/523,587

(22) PCT Filed: Oct. 20, 2015

(86) PCT No.: PCT/JP2015/079490
§ 371 (c)(1),
(2) Date: May 1, 2017

(87) PCT Pub. No.: WO2016/067959
PCT Pub. Date: May 6, 2016

(65) Prior Publication Data
US 2017/0309911 A1    Oct. 26, 2017

(30) Foreign Application Priority Data
Oct. 30, 2014  (JP) ................................ 2014-221858

(51) Int. Cl.
*H01M 10/052*    (2010.01)
*H01M 4/525*    (2010.01)
(Continued)

(52) U.S. Cl.
CPC ............ *H01M 4/525* (2013.01); *C01G 53/04* (2013.01); *H01M 10/052* (2013.01);
(Continued)

(58) Field of Classification Search
CPC ............... H01M 4/525; H01M 10/052; H01M 2004/028; H01M 2220/30; C01G 53/04;
(Continued)

(56) References Cited

U.S. PATENT DOCUMENTS

2010/0273057 A1*  10/2010  Watanabe ............. H01M 4/131
429/223
2012/0276454 A1*  11/2012  Mori ..................... H01M 4/485
429/223
(Continued)

FOREIGN PATENT DOCUMENTS

JP   H11-60244 A   3/1999
JP   2008-130287 A   6/2008
(Continued)

OTHER PUBLICATIONS

Jan. 19, 2016 International Search Report issued with International Patent Application No. PCT/JP2015/079490.

*Primary Examiner* — Lisa S Park
(74) *Attorney, Agent, or Firm* — Oliff PLC

(57) ABSTRACT

Disclose herein are processes for producing a nickel cobalt aluminum composite hydroxide and producing a positive electrode active material for non-aqueous electrolyte secondary batteries. Nucleation is performed by controlling an aqueous solution for nucleation containing a nickel-containing metal compound, cobalt-containing metal compound, ammonium ion supplier, and aluminum source so that the aqueous solution's pH for nucleation is 12.0 to 13.4, and then in a particle growth step, particle growth is performed in an aqueous solution for particle growth obtained by
(Continued)

controlling the aqueous solution for nucleation obtained in the nucleation step so that the pH of aqueous solution for nucleation is 10.5 to 12.0. Further, in nucleation step, an aqueous solution containing aluminum and sodium is used as the aluminum source contained in aqueous solution for nucleation, and the mole ratio of sodium to aluminum in aqueous solution containing aluminum and sodium is adjusted to 1.5 to 3.0.

6 Claims, 2 Drawing Sheets

(51) Int. Cl.
  *H01M 4/02* (2006.01)
  *C01G 53/04* (2006.01)
(52) U.S. Cl.
  CPC ...... *C01P 2004/03* (2013.01); *C01P 2004/51* (2013.01); *C01P 2006/12* (2013.01); *H01M 2004/028* (2013.01); *H01M 2220/30* (2013.01); *Y02T 10/7011* (2013.01)

(58) Field of Classification Search
  CPC .............. C01P 2004/51; C01P 2006/12; C01P 2004/03
  See application file for complete search history.

(56) References Cited

U.S. PATENT DOCUMENTS

2013/0037742 A1  2/2013  Oda et al.
2014/0377660 A1  12/2014  Fukui et al.

FOREIGN PATENT DOCUMENTS

| JP | 2009-298679 A | 12/2009 |
| JP | 2010-257624 A | 11/2010 |
| JP | 2011-116608 A | 6/2011 |
| JP | 4767484 B2 | 9/2011 |
| JP | 2013-147416 A | 8/2013 |
| WO | 2011/099494 A1 | 8/2011 |

\* cited by examiner

PROCESS FOR PRODUCING NICKEL COBALT ALUMINUM COMPOSITE HYDROXIDE AND PROCESS FOR PRODUCING POSITIVE ELECTRODE ACTIVE MATERIAL FOR NON-AQUEOUS ELECTROLYTE SECONDARY BATTERIES

BACKGROUND OF THE INVENTION

Field of the Invention

The present invention relates to a process for producing a nickel cobalt aluminum composite hydroxide and a process for producing a positive electrode active material for non-aqueous electrolyte secondary batteries. This application is based upon and claims the benefit of priority from prior Japanese Patent Application No. 2014-221858 filed on Oct. 30, 2014 in Japan.

Description of Related Art

In recent years, there has been a strong demand for the development of compact and lightweight non-aqueous electrolyte secondary batteries having a high energy density due to the widespread use of portable electronic devices such as mobile phones and notebook computers. Further, there has also been a strong demand for the development of high-power secondary batteries as large-scale batteries such as power supplies for driving motors.

Examples of secondary batteries that satisfy these requirements include lithium ion secondary batteries. A lithium ion secondary battery includes a negative electrode, a positive electrode, and an electrolyte, and uses materials that can release and occlude lithium as a negative electrode active material and a positive electrode active material.

Lithium ion secondary batteries are now actively being researched and developed. Particularly, lithium ion secondary batteries using, as a positive electrode material, a layered or spinel-type lithium metal composite oxide can provide a 4 V-class high voltage, and are therefore practically used as batteries having a high energy density.

As a positive electrode material for such lithium ion secondary batteries, a lithium cobalt composite oxide ($LiCoO_2$) that can be relatively easily synthesized is conventionally mainly used. However, attention is being given to a lithium nickel composite oxide ($LiNiO_2$) that uses nickel cheaper than cobalt but is expected to have a higher capacity.

Meanwhile, a positive electrode material is required to include uniform particles having an appropriate particle diameter to allow a lithium ion secondary battery to achieve excellent performance (high cycle characteristic, low resistance, and high power).

This is because when a positive electrode material having a large particle diameter and a low specific surface area is used, an adequate reaction area between the positive electrode material and an electrolyte cannot be provided so that a high-power battery cannot be obtained due to an increase in reaction resistance, and on the other hand, when a positive electrode material having a wide particle size distribution is used, a problem occurs such as a reduction in battery capacity or an increase in reaction resistance. It is to be noted that the reason for the reduction in battery capacity is that a voltage is non-uniformly applied to the particles in an electrode so that fine particles are selectively degraded due to repeated charge and discharge.

Further, a shorter lithium ion migration distance between positive and negative electrodes is effective at increasing the output power of a lithium ion secondary battery. Therefore, a positive plate is required to be thinner. This is also the reason why positive electrode active material particles having a small particle diameter are useful.

Therefore, in order to enhance the performance of a positive electrode material, the above-described lithium nickel composite oxide also needs to be produced so as to have a uniform and small particle diameter.

Further, a lithium nickel composite oxide is usually produced from a composite hydroxide. Therefore, in order to produce a lithium nickel composite oxide including particles having a uniform and small particle diameter, a composite hydroxide used as a raw material thereof also needs to have a uniform and small particle diameter.

That is, in order to enhance the performance of a positive electrode material to produce a high-performance lithium ion secondary battery as a final product, a composite hydroxide used as a raw material of a lithium nickel composite oxide for forming a positive electrode material needs to include particles having a small particle diameter and a narrow particle size distribution.

As described above, a lithium nickel composite oxide is expected to have a high capacity, but has drawbacks such as a significant reduction in capacity after charge and discharge cycles and a low level of safety. It is known that addition of cobalt or aluminum is effective at overcoming such drawbacks. Particularly, a lithium nickel composite oxide containing 10 mol % or more of aluminum can significantly overcome such drawbacks.

For example, according to Patent Literature 1 that discloses a technique relating to an aluminum-containing lithium nickel composite oxide, a lithium nickel composite oxide is obtained by a solid-phase mixing method in which a nickel composite hydroxide and aluminum oxide or aluminum hydroxide are dry-mixed and calcined.

Patent Literature 1: JP 2008-130287 A
Patent Literature 2: Japanese Patent No. 4767484
Patent Literature 3: JP 2011-116608 A However, in the ease of the lithium nickel composite oxide obtained by a solid-phase mixing method in Patent Literature 1, segregation of aluminum is likely to occur even after calcination, which reduces the effect of improving a cycle characteristic and safety. In order to sufficiently exert such an effect in a lithium nickel composite oxide, it is important that aluminum be also coprecipitated during the production of a nickel composite hydroxide to uniformly distribute aluminum at the stage of a precursor.

Meanwhile, cobalt is similar in properties to nickel, and therefore it is relatively easy to homogeneously coprecipitate cobalt and nickel. However, aluminum is significantly different in properties from nickel, and therefore in the case of coprecipitation with nickel, aluminum hydroxide is particularly likely to precipitate singly due to an increase in aluminum content, which makes it difficult to obtain a composite hydroxide having a narrow particle size distribution.

For example, according to Patent Literature 2, a nickel cobalt aluminum composite hydroxide is produced as a precursor of $LiNiCoAlO_2$ (lithium nickel cobalt aluminum composite oxide) with the use of nickel sulfate, cobalt sulfate, and aluminum sulfate as raw materials. However, according to the results of a study by the present inventors etc., when aluminum sulfate is used as an aluminum source, aluminum hydroxide precipitates at a lower pH than nickel hydroxide or cobalt hydroxide, and is therefore likely to precipitate singly, which makes it impossible to obtain a composite hydroxide having a narrow particle size distribution.

According to Patent Literature 3, a nickel cobalt aluminum composite hydroxide is produced as a precursor of a lithium nickel composite oxide with the use of sodium aluminate as an aluminum source. According to the results of a study by the present inventors etc., the use of sodium aluminate as an aluminum source allows aluminum hydroxide to precipitate at a pH close to a pH at which nickel hydroxide or cobalt hydroxide precipitates, which makes it easier to cause coprecipitation than when aluminum sulfate is used. However, an aqueous sodium aluminate solution is unstable, and therefore when sodium aluminate is used singly (when sodium and aluminum are equal in molar quantity), aluminum hydroxide does not stably precipitate, which makes it difficult to stably obtain a composite hydroxide having a uniform particle diameter.

As described above, a nickel cobalt aluminum composite hydroxide as a precursor of a positive electrode active material for non-aqueous electrolyte secondary batteries, which includes a lithium nickel composite oxide having an excellent cycle characteristic, a high level of safety, and a highly-uniform and small particle diameter, has not yet been stably supplied, and therefore there has been a demand for the development of a process for producing such a composite hydroxide.

In light of the above problems, it is an object of the present invention to provide a process for producing a nickel cobalt aluminum composite hydroxide having an excellent cycle characteristic, a high level of safety, and a highly-uniform and small particle diameter, and a process for producing a positive electrode active material for non-aqueous electrolyte secondary batteries.

SUMMARY OF THE INVENTION

In order to achieve the above object, the present invention is directed to a process for producing a nickel cobalt aluminum composite hydroxide by a crystallization reaction, the nickel cobalt aluminum composite hydroxide being represented by a general formula 1: $Ni_{1-x-y}Co_xAl_y(OH)_{2+\alpha}$ (wherein $0 \leq x \leq 0.3$, $0.1 \leq y \leq 0.2$, $x+y<0.5$, $0 \leq \alpha \leq 0.5$), the process including: a nucleation step in which nucleation is performed by controlling an aqueous solution for nucleation containing a nickel-containing metal compound, a cobalt-containing metal compound, an ammonium ion supplier, and an aluminum source such that a pH of the aqueous solution for nucleation is 12.0 to 13.4 as a pH measured on a basis of a liquid temperature of 25° C.; and a particle growth step in which particle growth is performed in an aqueous solution for particle growth obtained by controlling the aqueous solution for nucleation obtained in the nucleation step such that a pH of the aqueous solution for particle growth is 10.5 to 12.0 as a pH measured on a basis of a liquid temperature of 25° C., wherein in the nucleation step, an aqueous solution containing aluminum and sodium is used as the aluminum source contained in the aqueous solution for nucleation, and a mole ratio of sodium to aluminum in the aqueous solution containing aluminum and sodium is adjusted to 1.5 to 3.0.

In order to achieve the above object, the present invention is also directed to a process for producing a positive electrode active material for non-aqueous electrolyte secondary batteries, which includes a lithium nickel cobalt aluminum composite oxide, from a nickel cobalt aluminum composite hydroxide and/or a nickel cobalt aluminum composite oxide, the nickel cobalt aluminum composite hydroxide being represented by a general formula 1: $Ni_{1-x-y}Co_xAl_y(OH)_{2+\alpha}$ (wherein $0 \leq x \leq 0.3$, $0.1 \leq y \leq 0.2$, $x+y<0.5$, $0 \leq \alpha \leq 0.5$), the lithium nickel cobalt aluminum composite oxide including a hexagonal lithium-containing composite oxide having a layered structure and being represented by a general formula 2: $Li_tNi_{1-x-y}Co_xAl_yO_2$ (wherein $0.95 \leq t \leq 1.15$, $0 \leq x \leq 0.3$, $0.1 \leq y \leq 0.2$, $x+y<0.5$), the process including: a nucleation step in which nucleation is performed by controlling an aqueous solution for nucleation containing a nickel-containing metal compound, a cobalt-containing metal compound, an ammonium ion supplier, and an aluminum source such that a pH of the aqueous solution for nucleation is 12.0 to 13.4 as a pH measured on a basis of a liquid temperature of 25° C.; a particle growth step in which particle growth is performed in an aqueous solution for particle growth obtained by controlling the aqueous solution for nucleation obtained in the nucleation step such that a pH of the aqueous solution for particle growth is 10.5 to 12.0 as a pH measured on a basis of a liquid temperature of 25° C.; a mixing step in which a mixture is formed by mixing a lithium compound with a nickel cobalt aluminum composite hydroxide and/or a nickel cobalt aluminum composite oxide obtained by heat-treating a nickel cobalt aluminum composite hydroxide in an oxidizing atmosphere; and a calcining step in which the mixture obtained in the mixing step is calcined, wherein in the nucleation step, an aqueous solution containing aluminum and sodium is used as the aluminum source contained in the aqueous solution for nucleation, and a mole ratio of sodium to aluminum in the aqueous solution containing aluminum and sodium is adjusted to 1.5 to 3.0.

According to the present invention, it is possible to produce a nickel cobalt aluminum composite hydroxide having an excellent cycle characteristic, a high level of safety, and a highly-uniform and small particle diameter and further produce a positive electrode active material for non-aqueous electrolyte secondary batteries.

Figure 1:
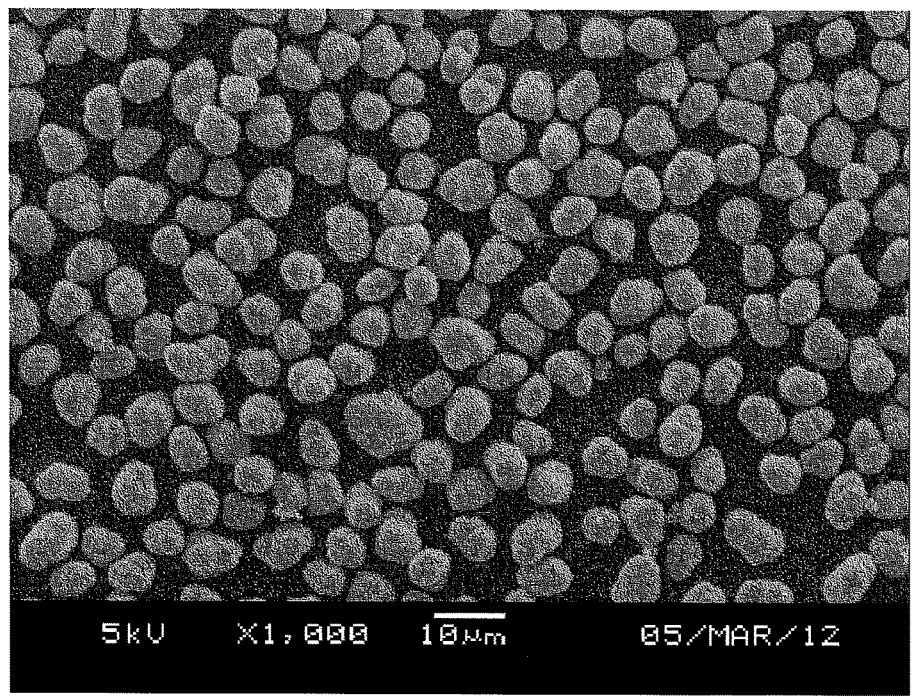
FIG. 1 is a photograph showing the SEM observation image of particles obtained in a particle growth step in Example 1.

Specific embodiments according to the present invention (hereinafter, referred to as "present embodiments") will be described in detail in the following order with reference to the drawings. It is to be noted that the present invention is not limited to the following embodiments, and various changes may be made without departing from the scope of the present invention.

1. Nickel Cobalt Aluminum Composite Hydroxide
  1-1. Particle Structure
  1-2. Particle Size Distribution
  1-3. Average Particle Diameter
  1-4. Composition
2. Positive Electrode Active Material for Non-Aqueous Electrolyte Secondary Battery
  2-1. Composition
  2-2. Average Particle Diameter
  2-3. Particle Size Distribution 3. Process for Producing Nickel Cobalt Aluminum Composite Hydroxide
  3-1. Nucleation Step
  3-2. Particle Growth Step
  3-3. Common Conditions
4. Process for Producing Positive Electrode Active Material for Non-Aqueous Electrolyte Secondary Battery
  4-1. Heat Treatment Step
  4-2. Mixing Step
  4-3. Calcining Step

[1. Nickel Cobalt Aluminum Composite Hydroxide]

A nickel cobalt aluminum composite hydroxide according to a present embodiment (hereinafter, simply referred to as "composite hydroxide") includes spherical secondary particles formed by aggregation of a plurality of plate-shaped primary particles. The composite hydroxide is adjusted to have a predetermined average particle diameter and a predetermined value of [(D90-D10)/average particle diameter] that is an index indicating the dispersion of particle size distribution, and is therefore particularly suitable as a raw material of a positive electrode active material for non-aqueous electrolyte secondary batteries according to a present embodiment that will be described later. The composite hydroxide will be described below in detail on the precondition that the composite hydroxide is used as a raw material of a positive electrode active material.

<1-1. Particle Structure>

The composite hydroxide is adjusted to include spherical particles, more specifically spherical secondary particles formed by aggregation of a plurality of plate-shaped primary particles. When the composite hydroxide has such a structure, lithium is satisfactorily diffused in the particles in a calcining step for forming a positive electrode active material, which will be described later, so that an excellent positive electrode active material is obtained in which lithium is uniformly distributed.

The composite hydroxide more preferably includes spherical secondary particles formed by aggregation of plate-shaped primary particles in random directions. The reason for this is that when plate-shaped primary particles are aggregated in random directions, voids are substantially uniformly created among the primary particles, and therefore when the composite hydroxide is mixed with a lithium compound and the mixture is calcined, the fused lithium compound is distributed in the secondary particles so that lithium is satisfactorily diffused.

<1-2. Particle Size Distribution>

The composite hydroxide is adjusted so that the value of [(D90-D10)/average particle diameter], which is an index indicating the dispersion of particle size distribution, is 0.50 or less.

The particle size distribution of a positive electrode active material is strongly influenced by the composite hydroxide as a raw material. Therefore, when the composite hydroxide contains fine particles or coarse particles, a resulting positive electrode active material also contains fine particles or coarse particles. That is, if the value of [(D90-D10)/average particle diameter] exceeds 0.50, that is, if the composite hydroxide has a wide particle size distribution, a resulting positive electrode active material also contains fine particles or coarse particles.

When the composite hydroxide is adjusted so that the value of [(D90-D10)/average particle diameter] is 0.50 or less, a positive electrode active material obtained using the composite hydroxide as a raw material also has a narrow particle size distribution and a uniform particle diameter. That is, the composite hydroxide makes it possible to obtain a positive electrode active material whose value of [(D90-D10)/average particle diameter] as an index of particle size distribution is 0.55 or less, and a battery having an electrode formed of a positive electrode active material formed using the composite hydroxide as a raw material can have an excellent cycle characteristic and can output a high power.

<1-3. Average Particle Diameter>

The composite hydroxide is adjusted to have an average particle diameter of 3 μm to 20 μm. When the average particle diameter is 3 μm to 20 μm, a positive electrode active material obtained using the composite hydroxide as a raw material can be adjusted to have a predetermined average particle diameter (3 μm to 25 μm), that is, a positive electrode active material can be formed using the composite hydroxide as a raw material.

If the composite hydroxide has an average particle diameter of less than 3 μm, a resulting positive electrode active material also has a small average particle diameter, which reduces the filling density of a positive electrode and the capacity of a battery per volume. On the other hand, if the composite hydroxide has an average particle diameter exceeding 20 μm, the specific surface area of a resulting positive electrode active material is reduced so that the interface between the positive electrode active material and an electrolyte is reduced, which increases the resistance of a positive electrode and deteriorates the output characteristic of a battery.

For this reason, the composite hydroxide is adjusted to have an average particle diameter of 3 μm to 20 μm. In this case, a positive electrode active material can be obtained using the composite hydroxide as a raw material, and a battery having a positive electrode using the positive electrode active material can have an excellent battery characteristic.

<1-4. Composition>

The composite hydroxide is represented by a general formula 1: $Ni_{1-x-y}Co_xAl_y(OH)_{2+\alpha}$ (wherein $0 \le x \le 0.3$, $0.1 \le y \le 0.2$, $x+y<0.5$, and $0 \le \alpha \le 0.5$).

The composite hydroxide having such a composition is suitable as a raw material for producing a positive electrode active material. When a positive electrode active material is produced using the composite hydroxide as a raw material and is used as an electrode of a battery, the battery can have a low measured value of positive electrode resistance and an excellent output characteristic.

[2. Positive Electrode Active Material for Non-Aqueous Electrolyte Secondary Battery]

A positive electrode active material for non-aqueous electrolyte secondary batteries according to a present embodiment (hereinafter, sometimes simply referred to as "positive electrode active material") includes a lithium nickel cobalt aluminum composite oxide including a hexagonal lithium-containing composite oxide having a layered structure. The lithium nickel cobalt aluminum composite oxide is adjusted to have a predetermined composition, a predetermined average particle diameter, and a predetermined particle size distribution, and therefore has an excellent cycle characteristic, a high level of safety, and a highly-uniform and small particle diameter and is suitable as a material of a positive electrode of a non-aqueous electrolyte secondary battery.

<2-1. Composition>

The positive electrode active material includes a lithium nickel cobalt aluminum composite oxide having a composition represented by a general formula 2: $Li_tNi_{1-x-y}Co_xAl_yO_2$ (wherein $0.95 \le t \le 1.15$, $0 \le x \le 0.3$, $0.1 \le y \le 0.2$, and $x+y<0.5$).

In the positive electrode active material, the atomic ratio t of lithium is preferably in the above range ($0.95 \le t \le 1.15$). If the atomic ratio t of lithium is lower than 0.95, the reaction resistance of a positive electrode using the positive electrode active material in a non-aqueous electrolyte secondary battery is increased, which reduces the output of the battery. On the other hand, if the atomic ratio t of lithium is higher than 1.15, the initial discharge capacity of the positive electrode active material is reduced, and in addition, the reaction resistance of a positive electrode using the positive electrode active material is increased. For this reason, the atomic ratio t of lithium preferably satisfies $0.95 \le t \le 1.15$. Particularly, the atomic ratio t of lithium is more preferably 1.0 or higher.

It is to be noted that as can be seen from the atomic ratio of each of the metals contained in the positive electrode active material, the positive electrode active material may have a composition containing no cobalt. However, in order to achieve an excellent cycle characteristic, the positive electrode active material preferably contains cobalt. This is because the expansion and shrinkage behavior of a crystal lattice caused by extraction and insertion of lithium during charge and discharge can be reduced by replacing part of nickel in the crystal lattice with cobalt. Further, even when the positive electrode active material contains cobalt, x more preferably satisfies $0.08 \le x \le 0.17$. Particularly preferably, in consideration of a battery characteristic and safety, the atomic ratio between nickel and cobalt is substantially Ni:Co=0.82:0.15.

The positive electrode active material is preferably adjusted so that the atomic ratio y of aluminum with respect to the atoms x of all the metals other than lithium is 0.1 to 0.2. The reason for this is that addition of aluminum to the positive electrode active material makes it possible to improve the durability and safety of a battery using the positive electrode active material. Particularly, when the positive electrode active material is adjusted so that aluminum is uniformly distributed in particles of the positive electrode active material, there is an advantage that the particles as a whole can have the effect of improving the durability and safety of a battery, and therefore even when the amount of aluminum added is the same, a higher effect can be obtained and a reduction in capacity can be suppressed.

On the other hand, if the atomic ratio y of aluminum with respect to the atoms x of all the metals other than lithium is lower than 0.1, the positive electrode active material is undesirably poor in cycle characteristic and safety. Further, if the atomic ratio y of aluminum with respect to the atoms x of all the metals other than lithium in the positive electrode active material exceeds 0.20, metal elements that contribute to a Redox reaction are decreased so that a battery capacity is undesirably reduced.

<2-2. Average Particle Diameter>

The positive electrode active material is preferably adjusted to have an average particle diameter of 3 µm to 25 µm. If the positive electrode active material has an average particle diameter of less than 3 µm, the filling density of the particles in a positive electrode formed using the positive electrode active material is reduced, which reduces a battery capacity per volume of the positive electrode. On the other hand, if the positive electrode active material has an average particle diameter exceeding 25 µm, the specific surface area of the positive electrode active material is reduced so that the interface between the positive electrode active material and an electrolyte of a battery is reduced, which increases the resistance of a positive electrode and deteriorates the output characteristic of the battery.

Therefore, when the average particle diameter of the positive electrode active material is adjusted to 3 µm to 25 µm, preferably 3 µm to 15 µm, more preferably 4 µm to 12 µm, a battery having a positive electrode using the positive electrode active material can have a high battery capacity per volume, a high level of safety, and an excellent cycle characteristic.

<2-3. Particle Size Distribution>

The positive electrode active material is adjusted so that the value of [(D90-D10)/average particle diameter], which is an index indicating the dispersion of a particle size distribution, is 0.55 or less.

When having a wide particle size distribution, the positive electrode active material contains many fine particles whose particle diameters are much smaller than the average particle diameter or many particles (large-diameter particles) whose diameters are much larger than the average particle diameter. When a positive electrode is formed using a positive electrode active material containing many fine particles, there is a possibility that a local reaction of the fine particles occurs so that heat is generated, which not only reduces safety but also selectively degrades the fine particles and therefore deteriorates a cycle characteristic. On the other hand, when a positive electrode is formed using a positive electrode active material containing many large-diameter particles, an adequate reaction area between an electrolyte and the positive electrode active material is not provided so that the output of a battery is reduced due to an increase in reaction resistance.

Therefore, when the positive electrode active material is adjusted so that the value of [(D90-D10)/average particle diameter], which is an index indicating the dispersion of particle size distribution, is 0.55 or less, the ratio of fine particles or large-diameter particles is low, and therefore a battery having a positive electrode using the positive electrode active material can have a high level of safety and an excellent cycle characteristic and can output a high power.

It is to be noted that in [(D90-D10)/average particle diameter] that is an index indicating the dispersion of particle size distribution, D10 means a particle diameter at which the cumulative volume of particles reaches 10% of the total volume of all the particles when the number of particles is counted from a small particle size side. Further, D90 means a particle diameter at which the cumulative volume of particles reaches 90% of the total volume of all the particles when the number of particles is counted in the same manner as in the case of D10.

Here, a method for determining the average particle diameter, D10, and D90 is not particularly limited. For example, the average particle diameter, D10, and D90 may be determined from an arithmetic average diameter (volume-average diameter) or a volumetric integration value measured by a laser light diffraction-scattering-type particle size analyzer.

As described above, the positive electrode active material for non-aqueous electrolyte secondary batteries includes a lithium nickel cobalt aluminum composite oxide including a hexagonal lithium-containing composite oxide having a layered structure, and has an excellent cycle characteristic, a high-level of safety, and a highly-uniform and small particle diameter. Therefore, such a positive electrode active material for non-aqueous electrolyte secondary batteries is particularly suitable as a raw material of a positive electrode active material of a non-aqueous electrolyte secondary battery, and allows a battery to have a high level of safety and a reduced size and to output a higher power

[3. Process for Producing Nickel Cobalt Aluminum Composite Hydroxide]

In a process for producing a nickel cobalt aluminum composite hydroxide according to a present embodiment (hereinafter, sometimes simply referred to as "process for producing a composite hydroxide"), a nickel cobalt aluminum composite hydroxide is obtained by a crystallization reaction and is then washed and dried to produce a nickel cobalt aluminum composite hydroxide. More specifically, the process for producing a composite hydroxide includes: a nucleation step in which nuclei of a nickel cobalt aluminum composite hydroxide are formed; and a particle growth step in which the nuclei formed in the nucleation step are grown.

In a conventional continuous crystallization process, a nucleation reaction and a particle growth reaction proceed at the same time in the same reaction vessel, and therefore a composite hydroxide having a wide particle size distribution is obtained. On the other hand, in the process for producing a composite hydroxide, the time when a nucleation reaction mainly occurs (nucleation step) and the time when a particle growth reaction mainly occurs (particle growth step) are clearly separated from each other. Therefore, even when both the steps are performed in the same reaction vessel, a composite hydroxide having a narrow particle size distribution can be obtained.

<3-1. Nucleation Step>

In the nucleation step, a nickel-containing metal compound and a cobalt-containing metal compound are first dissolved in water in a predetermined ratio to prepare a nickel-cobalt mixed aqueous solution. Further, in the nucleation step, a compound containing aluminum and sodium is dissolved in a predetermined amount of water to separately prepare an aqueous solution, and further, a predetermined amount of sodium hydroxide is added to the aqueous solution to prepare an aqueous solution containing aluminum and sodium.

On the other hand, in the nucleation step, an aqueous alkali solution such as an aqueous sodium hydroxide solution, an aqueous ammonia solution containing an ammonium ion supplier, and water are supplied to a reaction vessel and mixed to prepare an aqueous solution (hereinafter, referred to as "pre-reaction aqueous solution"). In the nucleation step, the amount of the aqueous alkali solution to be supplied is adjusted to adjust the pH of the pre-reaction aqueous solution to 12.0 to 13.4 as a pH measured on the basis of a liquid temperature of 25° C. Further, in the nucleation step, the concentration of ammonium ions in the pre-reaction aqueous solution is adjusted to 3 g/L to 25 g/L, and the temperature of the pre-reaction aqueous solution is adjusted to 20° C. or higher. It is to be noted that the pH and the ammonium ion concentration of the pre-reaction aqueous solution in the reaction vessel can be measured by a common pH meter and a common ion meter, respectively.

In the nucleation step, after the temperature and the pH of the pre-reaction aqueous solution are adjusted, the nickel-cobalt mixed aqueous solution and the aqueous solution containing aluminum and sodium are supplied to the reaction vessel while the pre-reaction aqueous solution in the reaction vessel is stirred to prepare a mixed aqueous solution of the pre-reaction aqueous solution, the nickel-cobalt mixed aqueous solution, and the aqueous solution containing aluminum and sodium (hereinafter, referred to as "reaction aqueous solution"). In this way, in the nucleation step, fine nuclei of a composite hydroxide can be formed in the reaction aqueous solution. At this time, in the nucleation step, the pH of the reaction aqueous solution is in the range of 12.0 to 13.4, and therefore the formed nuclei are hardly grown and nucleation preferentially occurs.

In the nucleation step, the pH and the ammonium concentration of the reaction aqueous solution change as nucleation proceeds, and therefore the aqueous alkali solution and the aqueous ammonia solution are supplied to the reaction aqueous solution together with the nickel-cobalt mixed aqueous solution so that the pH and the ammonium ion concentration of the reaction aqueous solution are controlled to be maintained at predetermined values.

In the nucleation step, when the nickel-cobalt mixed aqueous solution, the aqueous alkali solution, and the aqueous ammonia solution are continuously supplied to the reaction aqueous solution, continuous formation of new nuclei in the reaction aqueous solution is maintained. Then, when a predetermined amount of nuclei are formed in the reaction aqueous solution in the nucleation step, the nucleation reaction terminated. It is to be noted that in the nucleation step, whether or not a predetermined amount of nuclei have been formed in the reaction aqueous solution is determined based on the amounts of metal salts added to the reaction aqueous solution.

In the nucleation step, the reaction aqueous solution, that is, the mixed aqueous solution of the pre-reaction aqueous solution, the nickel-cobalt mixed aqueous solution, and the aqueous solution containing aluminum and sodium whose pH is adjusted to 12.0 to 13.4 is an aqueous solution for nucleation.

(pH)

In the nucleation step, the pH of the pre-reaction aqueous solution is adjusted to 12.0 to 13.4 as a pH measured on the basis of a liquid temperature of 25° C., and further, the pH of the reaction aqueous solution during nucleation is also adjusted to be maintained at 12.0 to 13.4 as a pH measured on the basis of a liquid temperature of 25° C.

If the pH is higher than 13.4, there is a problem that excessively fine nuclei are formed so that the reaction aqueous solution is gelled. On the other hand, if the pH is lower than 12.0, a nucleus growth reaction occurs together with nucleation so that non-uniform nuclei are formed which have a wide particle size distribution.

For this reason, in the nucleation step, the pH of the reaction aqueous solution needs to be adjusted to 12.0 to 13.4. When the pH of the reaction aqueous solution is in such a range, almost only nucleation is allowed to occur while nucleus growth is suppressed so that uniform nuclei are formed which have narrow particle size distribution.

(Amount of Nucleation)

In the nucleation step, the amount of nuclei to be formed is not particularly limited. However, in order to obtain a composite hydroxide having an excellent particle size distribution, the amount of nuclei to be formed is preferably 0.1% to 2%, more preferably 1.5% or less of the total amount of metal salts supplied to obtain a composite hydroxide.

(Particle Diameter Control)

The particle diameter of the composite hydroxide can be controlled by the pH of the reaction aqueous solution not only in the particle growth step that will be described later but also in the nucleation step and the amounts of raw materials added for nucleation.

That is, in the nucleation step, the number of nuclei to be formed is increased by adjusting the pH of the reaction aqueous solution during nucleation to a value on the high pH side or by increasing the time of nucleation to increase the amounts of raw materials to be added. When the nucleation step is performed in such a manner, the particle diameter of the composite hydroxide can be reduced even when the particle growth step that will be described later is performed under the same conditions.

On the other hand, when the nucleation step is controlled so that the number of nuclei to be formed is reduced, the particle diameter of the composite hydroxide can be increased.

<3-2. Particle Growth Step>

In the particle growth step, a particle growth reaction is performed by adjusting the pH of the reaction aqueous solution (aqueous solution for nucleation) obtained in the nucleation step to 10.5 to 12.0 as a pH measured on the basis of a liquid temperature of 25° C. so that particles of a composite hydroxide (composite hydroxide particles) are obtained. More specifically, the pH of the reaction aqueous solution is controlled by adding an inorganic acid that is of the same type as an acid constituting the metal compounds, for example, sulfuric acid or by adjusting the amount of the aqueous alkali solution to be supplied.

In the particle growth step, when the pH of the reaction aqueous solution is 12.0 or lower, a composite hydroxide having a predetermined particle diameter is formed in the reaction aqueous solution. In the particle growth step, the pH of the reaction aqueous solution is in the range of 10.5 to 12.0, and therefore a nucleus growth reaction preferentially occurs as compared to a nucleation reaction so that new nuclei are hardly formed in the reaction aqueous solution.

Then, in the particle growth step, the particle growth reaction is terminated when a predetermined amount of the composite hydroxide having a predetermined particle diameter is formed in the reaction aqueous solution. It is to be noted that in the particle growth step, the amount of the formed composite hydroxide having a predetermined particle diameter is determined based on the amounts of metal salts added to the reaction aqueous solution.

In the particle growth step, the reaction aqueous solution, that is, the mixed aqueous solution of the pre-reaction aqueous solution, the nickel-cobalt mixed aqueous solution, and the aqueous solution containing aluminum and sodium whose pH is adjusted to 10.5 to 12.0 is an aqueous solution for particle growth.

(pH)

In the particle growth step, the of the reaction aqueous solution during nucleus growth is adjusted to be maintained at 10.5 to 12.0 as a pH measured on the basis of a liquid temperature of 25° C.

If the pH is higher than 12.0, a large number of nuclei are newly formed so that a composite hydroxide having an excellent particle diameter distribution cannot be obtained. On the other hand, if the pH is lower than 10.5, it is difficult to coprecipitate nickel and cobalt, and therefore each of them precipitates singly so that a composite hydroxide having a wide particle size distribution is undesirably obtained.

For this reason, in the particle growth step, the pH of the reaction aqueous solution needs to be adjusted to 10.5 to 12.0. When the pH of the reaction aqueous solution is in the above range, only the growth of nuclei formed in the nucleation step preferentially occurs so that formation of new nuclei can be suppressed, which makes it possible to form a uniform composite hydroxide having a narrow particle size distribution.

It is to be noted that in the process for producing a composite hydroxide, when the pH of the reaction aqueous solution is 12, the reaction aqueous solution is under the boundary condition between nucleation and nucleus growth. In this case, either the nucleation step or the particle growth step may be performed depending on the presence or absence of nuclei in the reaction aqueous solution.

That is, in the process for producing a composite hydroxide, when the pH of the reaction aqueous solution in the nucleation step is adjusted to be higher than 12 to form a large amount of nuclei and then the pH of the reaction aqueous solution in the particle growth step is adjusted to 12, a large amount of nuclei are present in the reaction aqueous solution, and therefore nucleus growth preferentially occurs so that a composite hydroxide having a narrow particle diameter distribution and a relatively large particle diameter is obtained.

On the other hand, in the process for producing a composite hydroxide, when nuclei are not present in the reaction aqueous solution, that is, when the pH of the reaction aqueous solution in the nucleation step is adjusted to 12, nucleation preferentially occurs because of the absence of nuclei to be grown, and therefore formed nuclei are grown by adjusting the pH of the reaction aqueous solution in the particle growth step to lower than 12 so that an excellent composite hydroxide is obtained.

In either case, the pH of the reaction aqueous solution in the particle growth step in the process for producing a composite hydroxide is controlled to be lower than the pH of the reaction aqueous solution in the nucleation step.

(Particle Diameter Control)

The particle diameter of the composite hydroxide can be controlled not only by the time of the nucleation step but also by the time of the particle growth step. Therefore, in the particle growth step, a composite hydroxide having a predetermined particle diameter can be obtained by continuing the particle growth reaction until the nuclei are grown to have a predetermined particle diameter.

<3-3. Common Conditions>

Hereinbelow, conditions common to both the above-described nucleation step and particle growth step will be described in detail. The difference in conditions between the nucleation step and the particle growth step is only the condition for controlling the reaction aqueous solution so that the pH of the reaction aqueous solution is in a predetermined range. Therefore, the common conditions that will be described below are substantially the same between both the steps.

(Nickel-Cobalt Mixed Aqueous Solution)

As the metal compound containing a metal necessary for forming a desired nickel cobalt aluminum composite hydroxide, a water soluble metal compound is preferably used. Examples of such a water soluble metal compound include a nitrate, a sulfate, and a hydrochloride. For example, nickel sulfate and cobalt sulfate can be preferably used.

The composition ratio between metals in the composite hydroxide is the same as that in the nickel-cobalt mixed aqueous solution. Therefore, in the process for producing a composite hydroxide, the nickel-cobalt mixed aqueous solution is formed by adjusting the ratio of each of the metal compounds to be dissolved in water so that the ratio of the number of atoms of each metal ion in the nickel-cobalt mixed aqueous solution coincides with the ratio of the number of atoms of each metal ion in the composite hydroxide.

(Aqueous Solution Containing Aluminum and Sodium)

As the aqueous solution containing aluminum and sodium, for example, an aqueous sodium aluminate solution ay be used which is obtained by dissolving, in a predetermined amount of water, a compound containing aluminum and sodium whose mole ratio of sodium (Na) to aluminum (Al) (Na/Al) is 1.5 to 3.0, such as sodium aluminate.

For example, when aluminum sulfate and else is used, instead of a compound containing aluminum and sodium, in a coprecipitation process, aluminum hydroxide precipitates at a lower pH than nickel hydroxide or cobalt hydroxide and is therefore likely to precipitate singly, which makes it impossible to obtain a composite hydroxide having a narrow particle size distribution. Therefore, in order to obtain a composite hydroxide having a narrow particle size distribution, it is necessary to coat a composite hydroxide with aluminum after the composite hydroxide is formed by previously coprecipitating a nickel compound and a cobalt compound.

On the other hand, the process for producing a composite hydroxide uses a compound containing aluminum and sodium whose mole ratio of sodium to aluminum is 1.5 to 3.0, and therefore nickel hydroxide, cobalt hydroxide, and aluminum hydroxide can be homogeneously coprecipitated. Therefore, the aqueous solution containing aluminum and sodium and the nickel-cobalt mixed aqueous solution can be added at the same time in the process for producing a composite hydroxide, which makes it possible to simplify the process. Further, the process for producing a composite hydroxide makes it possible also to uniformly disperse aluminum in the composite hydroxide.

If the mole ratio of the amount of sodium, that is, the amount of sodium hydroxide to the amount of aluminum is not in the range of 1.5 to 3.0, as in the case of the nucleation step, the stability of the aqueous solution containing aluminum and sodium, such as an aqueous sodium aluminate solution, is reduced, and therefore aluminum hydroxide is likely to precipitate as fine particles just after or before the aqueous solution containing aluminum and sodium is added to the reaction vessel. As a result, in the process for producing a composite hydroxide, a coprecipitation reaction with nickel hydroxide and cobalt hydroxide is less likely to occur, which undesirably causes a problem that a composite hydroxide having a wide particle size distribution is formed, or a composite hydroxide having a non-uniform aluminum concentration distribution is formed.

(Temperature of Reaction Solution)

In the process for producing a composite hydroxide, the temperature of the reaction aqueous solution in the reaction vessel is preferably set to 20° C. or higher, more preferably 20° C. to 60° C. If the temperature of the reaction aqueous solution is lower than 20° C., nucleation is likely to occur due to a low temperature, which makes it difficult to control nucleation. On the other hand, if the temperature of the reaction aqueous solution exceeds 60° C., volatilization of ammonia is promoted, and therefore the ammonium ion supplier needs to be excessively added to maintain a predetermined ammonium ion concentration.

For this reason, in the process for producing a composite hydroxide, the temperature of the reaction aqueous solution in the reaction vessel is set to 20° C. or higher, which makes it easy to control nucleation and to form nuclei suitable for producing a uniform composite hydroxide having a narrow particle size distribution.

(Concentration of Ammonium Ion)

In the process for producing a composite hydroxide, the concentration of ammonium ions in the reaction aqueous solution in the reaction vessel is preferably maintained at a constant value in the range of 3 g/L to 25 g/L.

In the process for producing a composite hydroxide, ammonia functions as a complexing agent. If the concentration of ammonium ions in the reaction aqueous solution is less than 3 g/L, the solubility of metal ions cannot be maintained constant. Therefore, plate-shaped composite hydroxide primary particles uniform in shape and particle diameter cannot be formed, but gel-like nuclei are likely to be formed so that a resulting composite hydroxide is likely to have a wide particle size distribution.

On the other hand, if the concentration of ammonium ions in the reaction aqueous solution exceeds 25 g/L, the solubility of metal ions is excessively increased, and therefore the amount of metal ions remaining in the reaction aqueous solution is increased so that a problem such as composition deviation occurs.

For this reason, in the process for producing a composite hydroxide, the solubility of metal ions can be adjusted to be in a predetermined range by maintaining the concentration of ammonium ions in the reaction aqueous solution in the reaction vessel at a constant value in the range of 3 g/L to 25 g/L, and therefore a composite hydroxide uniform in shape and particle diameter can be formed which has a narrow particle size distribution.

Further, in the process for producing a composite hydroxide, when the concentration of ammonium ions in the reaction aqueous solution varies, the solubility of metal ions also varies, which makes it impossible to form hydroxide particles having a uniform particle diameter. For this reason, the concentration of ammonium ions in the reaction aqueous solution is preferably maintained at a constant value. For example, in the process for producing a composite hydroxide, the concentration of ammonium ions in the reaction aqueous solution is preferably maintained at a desired value whose upper limit and lower limit have a difference of about 5 g/L.

It is to be noted that the ammonium ion supplier contained in the aqueous ammonia solution used in the process for producing a composite hydroxide is not particularly limited, and examples of the ammonium ion supplier include ammonia, ammonium sulfate, ammonium chloride, ammonium carbonate, and ammonium fluoride.

Further, when a positive electrode active material is obtained according to a process for producing a positive electrode active material that will be described later, the composition ratio (Ni:Co:Al) of the composite hydroxide is maintained also in the positive electrode active material. Therefore, the composition ratio of the composite hydroxide needs to be adjusted to be the same as that of a desired positive electrode active material.

As described above, in the process for producing a composite hydroxide, the atomic ratio y of aluminum with respect to the atoms x of all the metals other than lithium is preferably adjusted to 0.1 to 0.2. Therefore, the amount of aluminum contained in the positive electrode active material is also preferably adjusted so that the atomic ratio of aluminum of the positive electrode active material is the same as that of the composite hydroxide.

Further, in order to uniformly distribute aluminum in particles of a positive electrode active material formed from the composite hydroxide, in the process for producing a composite hydroxide, aluminum is preferably uniformly distributed in particles of the composite hydroxide as a raw material.

[4. Process for Producing Positive Electrode Active Material for Non-Aqueous Electrolyte Secondary Battery]

A process for producing a positive electrode active material for non-aqueous electrolyte secondary batteries according to a present embodiment (hereinafter, sometimes simply referred to as "process for producing a positive electrode active material") is not particularly limited as long as a positive electrode active material for non-aqueous electrolyte secondary batteries including a lithium nickel cobalt aluminum composite oxide can be produced to have the above-described crystalline structure, composition, average particle diameter, and particle size distribution. However, a process for producing a positive electrode active material that will be described later is preferably used because a positive electrode active material can be more reliably produced.

The process for producing a positive electrode active material includes: a heat treatment step in which particles of a nickel cobalt aluminum composite hydroxide as a raw material of a positive electrode active material are heat-treated; a mixing step in which a lithium compound is mixed with the heat-treated particles to obtain a mixture; and a calcining step in which the mixture obtained in the mixing step is calcined. Then, in the process for producing a positive electrode active material, a calcined product is disintegrated to obtain a lithium nickel composite oxide, that is, a positive electrode active material.

Here, the disintegration refers to an operation in which mechanical energy is applied to aggregates of secondary particles formed by sintering necking or the like of secondary particles during calcination to separate the secondary particles from one another almost without damaging the secondary particles to loosen the aggregates.

<4-1. Heat Treatment Step>

The heat treatment step is a step in which a nickel cobalt aluminum composite hydroxide (hereinafter, sometimes simply referred to as "composite hydroxide") is subjected to heat treatment by heating the composite hydroxide to remove moisture contained in the composite hydroxide. In the process for producing a positive electrode active material, this heat treatment step may be omitted. However, moisture remaining in the particles until the calcining step can be reduced by subjecting the particles to heat treatment, which makes it possible to convert the composite hydroxide into a composite oxide to prevent variations in the ratio of the number of atoms of a metal or the ratio of the number of atoms of lithium in a resulting positive electrode active material.

In the heat treatment step, moisture removal may be performed to the extent that the ratio of the number of atoms of a metal or the ratio of the number of atoms of lithium in the positive electrode active material does not vary, and therefore it is not always necessary to completely convert the composite hydroxide into a composite oxide.

In the heat treatment step, the composite hydroxide may be heated to a temperature at (hereinafter, sometimes simply referred to as "heat-treated particles") and a substance containing lithium (hereinafter, sometimes simply referred to as "lithium-containing substance") such as a lithium compound are mixed to obtain a lithium mixture.

Here, the heat-treated particles are nickel composite hydroxide particles obtained by removing their residual moisture in the heat treatment step, nickel composite oxide particles obtained by conversion into an oxide in the heat treatment step, or a mixture of these particles.

The heat-treated particles and the lithium-containing substance are mixed so that the ratio between the number of atoms of the metals other than lithium, that is, the total number (Me) of atoms of nickel, cobalt, and an additive element and the number of atoms of lithium (Li) (Li/Me) in the lithium mixture is 0.95 to 1.15, more preferably 1.0 to 1.10. That is, in the mixing step, the heat-treated particles and the lithium-containing substance are mixed so that the ratio Li/Me of the lithium mixture is the same as that of a desired positive electrode active material. This is because the ratio Li/Me does not change before and after the calcining step, and therefore the ratio Li/Me achieved by mixing in the mixing step becomes the ratio Li/Me of a resulting positive electrode active material.

In the mixing step, the lithium-containing substance to be used for forming the lithium mixture is not particularly limited, but a lithium compound such as lithium hydroxide, lithium nitrate, lithium carbonate, or a mixture of two or more of them is preferred in terms of availability. Particularly, lithium hydroxide is more preferably used in the mixing step in consideration of ease of handling and quality stability. which its residual moisture is removed, and the temperature of the heat treatment is not particularly limited, but is preferably 300° C. to 800° C. If the heat treatment temperature is lower than 300° C., the decomposition of the composite hydroxide does not satisfactorily proceed. This reduces the significance of performing the heat treatment step, and is therefore not industrially acceptable. On the other hand, if the heat treatment temperature exceeds 800° C., there is a case where the particles converted into a composite oxide are aggregated by sintering.

In the heat treatment step, an atmosphere in which the heat treatment is performed is not particularly limited, but the heat treatment is preferably performed in an air flow, which makes it easy to perform the heat treatment.

In the heat treatment step, the time of the heat treatment is not particularly limited. However, if the time of the heat treatment is less than 1 hour, there is a case where residual moisture in the composite hydroxide is not satisfactorily removed. For this reason, the time of the heat treatment is preferably at least 1 hour, more preferably 2 hours to 1.5 hours.

In the heat treatment step, equipment to be used for the heat treatment is not particularly limited as long as the composite hydroxide can be heated in an air flow. For example, a blowing dryer or an electric furnace that does not generate gas is suitably used.

<4-2. Mixing Step>

The mixing step is a step in which the particles heat-treated in the heat treatment step In the mixing step, the lithium mixture is preferably sufficiently mixed before calcination. If the lithium mixture is not sufficiently mixed, there is a possibility that the ratio Li/Me varies among the individual particles, which causes a problem that a satisfactory battery characteristic cannot be achieved.

In the mixing step, the mixing can be performed using a common mixing machine such as a shaker mixer, a Lodige mixer, a Julia mixer, or a V blender. When such a mixing machine is used, the heat-treated particles and the lithium-containing substance may be sufficiently mixed to the extent that the structure of the composite hydroxide particles or the like is not broken.

<4-3. Calcining Step>

The calcining step is a step in which the lithium mixture obtained in the mixing step is calcined to obtain a calcined product. In the process for producing a positive electrode active material, the calcined product obtained in the calcining step is disintegrated to obtain a lithium nickel composite oxide. When the lithium mixture is calcined in the calcining step, lithium contained in the lithium-containing substance is diffused in the heat-treated particles so that a lithium nickel composite oxide is formed.

In the calcining step, the lithium mixture is calcined at 700° C. to 950° C., particularly preferably 720° C. to 820° C. If the calcining temperature of the lithium mixture is less than 700° C., lithium is not satisfactorily diffused in the heat-treated particles, and therefore excess lithium remains, some of the heat-treated particles remain as unreacted particles, or the crystalline structure is not satisfactorily uniform, which causes a problem that a satisfactory battery characteristic cannot be achieved.

On the other hand, if the calcining temperature of the lithium mixture exceeds 950° C., there is a possibility that heavy sintering occurs among the heat-treated particles and abnormal particle growth occurs. As a result, there is a possibility that in the calcining step, the calcined particles become coarse and therefore cannot maintain a particulate shape (the shape of a spherical secondary particle), which causes a problem that a resulting positive electrode active material has a reduced specific surface area so that a positive electrode resistance is increased and a battery capacity is reduced.

For this reason, in the calcining step, the lithium mixture is calcined at 700° C. to 950° C., particularly preferably 720° C. to 820° C.

In the calcining step, the calcining time of the lithium mixture is preferably at least 3 hours, more preferably 6 hours to 24 hours. If the calcining time of the lithium mixture is less than 3 hours, there is a case where a lithium nickel composite oxide is not satisfactorily formed.

Particularly, when lithium hydroxide, lithium carbonate, or the like is used as the lithium-containing substance, the lithium mixture is preferably subjected to pre-calcination by maintaining the lithium mixture at a temperature of 350° C. to 550° C. for about 1 hour to 10 hours before the lithium mixture is calcined at a temperature of 700° C. to 950° C. That is, in this case, the lithium mixture is preferably subjected to pre-calcination at the melting point or the reaction temperature of lithium hydroxide, lithium carbonate, or the like. When the lithium mixture is subjected to pre-calcination by maintaining it at about the melting point or the reaction temperature of lithium hydroxide, lithium carbonate, or the like, there is an advantage that lithium is satisfactorily diffused in the heat-treated particles so that a uniform lithium nickel composite oxide can be obtained.

In the calcining step, the lithium mixture is preferably calcined in an oxidizing atmosphere, particularly preferably an atmosphere whose oxygen concentration is 18 vol % to 100 vol %. That is, the lithium mixture is preferably calcined in an air atmosphere or an oxygen flow. This is because if the oxygen concentration is less than 18 vol %, there is a possibility that the nickel composite hydroxide contained in the heat-treated particles cannot be satisfactorily oxidized so that a resulting lithium nickel composite oxide does not have satisfactory crystallinity. In the calcining step, the lithium mixture is particularly preferably calcined in an oxygen flow in consideration of battery characteristic.

It is to be noted that a furnace to be used for calcining the lithium mixture is not particularly limited as long as the lithium mixture can be heated in an air atmosphere or an oxygen flow. For example, an electric furnace that does not generate gas is preferably used which may be either of a batch or continuous type.

As described above, in the nucleation step, nucleation preferentially occurs, and nucleus growth hardly occurs. On the other hand, in the particle growth step, only nucleus growth occurs, and new nuclei are hardly formed. Therefore, uniform nuclei having a narrow particle size distribution can be formed in the nucleation step, and the nuclei can be uniformly grown in the particle growth step. Therefore, a uniform positive electrode active material having a narrow particle size distribution can be obtained by the process for producing a positive electrode active material.

Further, in the process for producing a positive electrode active material, the nucleation step and the particle growth step can be separately performed in one reaction vessel simply by adjusting the pH of the reaction aqueous solution. Therefore, it can be said that the process for producing a positive electrode active material has a very great industrial value because the process for producing a positive electrode active material is easy and suitable for large-scale production.

EXAMPLES

Hereinbelow, the present invention will be described in more detail with reference to examples and comparative examples, but is not limited to these examples and comparative examples. It is to be noted that in each of the examples and comparative examples, a composite hydroxide, a positive electrode active material, and a secondary battery were produced using reagents (special grade) manufactured by Wako Pure Chemical Industries, Ltd.

It is to be noted that in each of the examples and comparative examples, the average particle diameter and the particle size distribution of a composite hydroxide or a positive electrode active material formed using the composite hydroxide as a raw material were determined in the following manner.

<Measurement of Average Particle Diameter and Particle Size Distribution>

The average particle diameter and the particle size distribution (value of ([D90-D10)/average particle diameter]) of a composite hydroxide or a positive electrode active material were calculated from a volumetric integration value measured using a laser diffraction-scattering-type particle size distribution measurement apparatus (Microtrac HRA manufactured by NIKKISO CO., LTD.).

Further, the crystalline structure was determined by an X-ray diffractometer (X'Pert PRO manufactured by PANalytical). The composition of an obtained composite hydroxide or an obtained positive electrode active material was determined by ICP emission spectrometry using a sample obtained by dissolving the composite hydroxide or the positive electrode active material.

Example 1

<Composite Hydroxide Production Step>

A composite hydroxide was formed in the following manner.

In Example 1, first, 0.9 L of water was placed in a reaction vessel (5 L), and the temperature in the reaction vessel was set to 50° C. while the water in the reaction vessel was stirred. Nitrogen gas was flowed into the reaction vessel to create a nitrogen atmosphere. At this time, the concentration of oxygen in the internal space of the reaction vessel was 2.0%.

Then, in Example 1, appropriate amounts of a 25% aqueous sodium hydroxide solution and 25% ammonia water were added to the water contained in the reaction vessel such that the pH of the reaction liquid was adjusted to 12.6 as a pH measured on the basis of a liquid temperature of 25° C. In this way, a pre-reaction aqueous solution was prepared. Further, the concentration of ammonium ions in the pre-reaction aqueous solution was adjusted to 10 g/L.

(Nucleation Step)

Then, in Example 1, nickel sulfate and cobalt sulfate were dissolved in water to prepare a 2.0 mol/L nickel-cobalt mixed aqueous solution so that the mole ratio among the metal elements in the nickel-cobalt mixed aqueous solution was adjusted to Ni:Co =0.82:0.15. Further, in Example 1, sodium aluminate was dissolved in a predetermined amount of water to separately prepare an aqueous sodium aluminate solution (aqueous solution containing aluminum and sodium), and a 25% aqueous sodium hydroxide solution was added so that the ratio of sodium to aluminum (Na/Al) was 1.7.

Then, in Example 1, the nickel-cobalt mixed aqueous solution was added to the pre-reaction aqueous solution contained in the reaction vessel at 12.9 mL/min, and at the same time, the aqueous sodium aluminate solution, 25% ammonia water (aqueous ammonia solution), and a 25% aqueous sodium hydroxide solution (aqueous alkali solution) were also added to the pre-reaction aqueous solution contained in the reaction vessel at constant rates to prepare a reaction aqueous solution. Then, in Example 1, nucleation was performed by crystallization for 2 minutes 30 seconds by controlling the pH of the reaction aqueous solution at 12.6 (nucleation pH) while maintaining the concentration of ammonium ions in the reaction aqueous solution at 10 g/L. It is to be noted that in Example 1, the addition rate of the aqueous sodium aluminate solution was adjusted so that the mole ratio among the metal elements in a slurry of the reaction aqueous solution was Ni:Co:Al=0.76:0.14:0.10.

(Particle Growth Step)

Then, in Example 1, 64% sulfuric acid was added until the pH of the reaction aqueous solution reached 11.6 (particle growth pH) as a pH measured on the basis of a liquid temperature of 25° C.

Then, in Example 1, after the pH of the reaction aqueous solution reached 11.6 as a pH measured on the basis of a liquid temperature of 25° C., particle growth was performed by crystallization for 4 hours by again supplying the nickel-cobalt mixed aqueous solution, the aqueous sodium aluminate solution, 25% ammonia water, and a 25% aqueous sodium hydroxide solution while controlling the pH at 11.6. Then, in Example 1, the thus obtained product was washed with water, filtered and dried to obtain particles.

In Example 1, the obtained particles were washed with water and then chemically analyzed, and as a result, the composition of the particles was found to be $Ni_{0.76}Co_{0.14}Al_{0.10}(OH)_{2+\alpha}$ ($0 \le \alpha \le 0.5$). In Example 1, the particle size distribution of the obtained nickel cobalt aluminum composite hydroxide was measured, and as a result, the nickel cobalt aluminum composite hydroxide was found to have an average particle diameter of 6.9 μm and a value of [(D90-D10)/average particle diameter] of 0.48.

Further, in Example 1, the obtained nickel cobalt aluminum composite hydroxide was observed with a scanning electron microscope (SEM) (S-4700 manufactured by Hitachi High-Technologies Corporation). As a result, as can be seen from an observation image shown n FIG. 1, it was confirmed that the nickel cobalt aluminum composite hydroxide had an almost spherical shape and a substantially uniform particle diameter.

<Positive Electrode Active Material Production Step>

In Example 1, the obtained nickel cobalt aluminum composite hydroxide was heat-treated in an air flow (oxygen: 21 vol %) at 700° C. for 6 hours, and the particles were collected.

Further, in Example 1, lithium hydroxide was weighed so that the ratio Li/Me was 1.02, and was mixed with the collected particles to prepare a mixture. The mixing was performed using a shaker mixer (TURBULA Type T2C manufactured by Willy A Bachofen (WAB)).

In Example 1, the obtained mixture was subjected to pre-calcination at 500° C. for 4 hours and then finally calcined at 730° C. for 24 hours in an oxygen flow (oxygen: 100 vol %), cooled, and then disintegrated to obtain a positive electrode active material.

In Example 1, the particle size distribution of the obtained positive electrode active material was measured, and as a result, the positive electrode active material was found to have an average particle diameter of 6.4 μm and a value of [(D90-D10)/average particle diameter] of 0.47.

Figure 2:
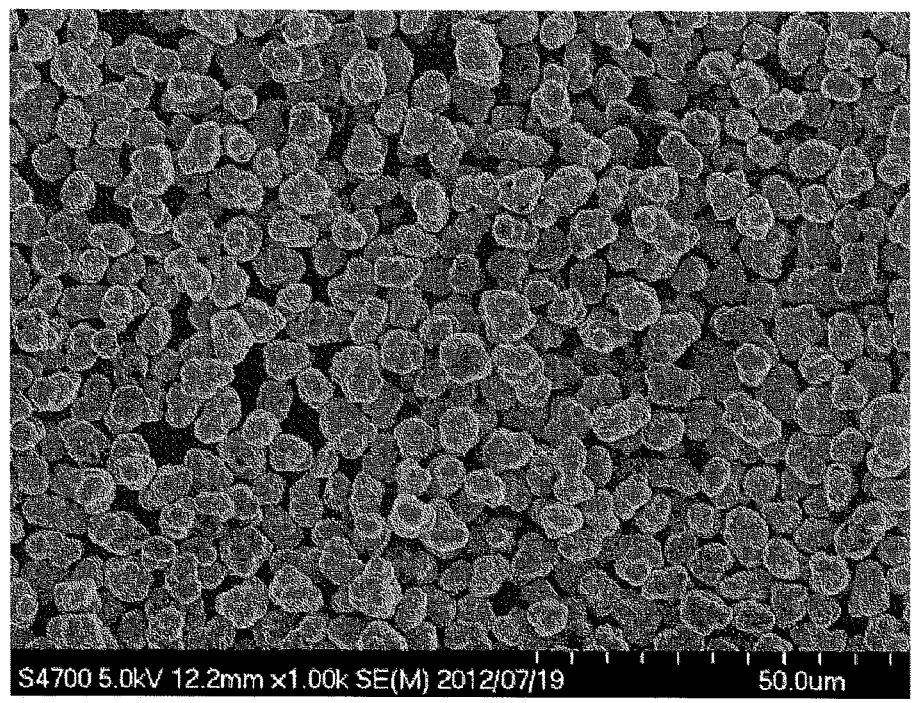
FIG. 2 is a photograph showing the SEM observation image of a material obtained in a positive electrode active material production step in Example 1.

Further, in Example 1, the obtained positive electrode active material was observed with a SEM in the same manner as in the case of the nickel cobalt aluminum composite hydroxide. As a result, as can be seen from an observation image shown in FIG. 2, it was confirmed that the positive electrode active material had an almost spherical shape and a substantially uniform particle diameter.

Further, in Example 1, the obtained positive electrode active material was analyzed by powder X-ray diffraction using Cu-Kα rays. As a result, it was confirmed that the positive electrode active material was composed of a single phase of a hexagonal layered crystalline lithium nickel cobalt composite oxide.

Further, in Example 1, the obtained positive electrode active material was chemically analyzed. As a result, it was confirmed that the positive electrode active material was $Li_{1.016}Ni_{0.76}Co_{0.14}Al_{0.10}O_2$ (lithium nickel cobalt aluminum composite oxide) having a composition of 7.6 mass % of Li, 46 mass % of Ni, 8.7 mass % of Co, and 2.9 mass % of Al.

<Battery Evaluation>

Then, in Example 1, the initial capacity of the obtained positive electrode active material was evaluated in the following manner.

Figure 3:
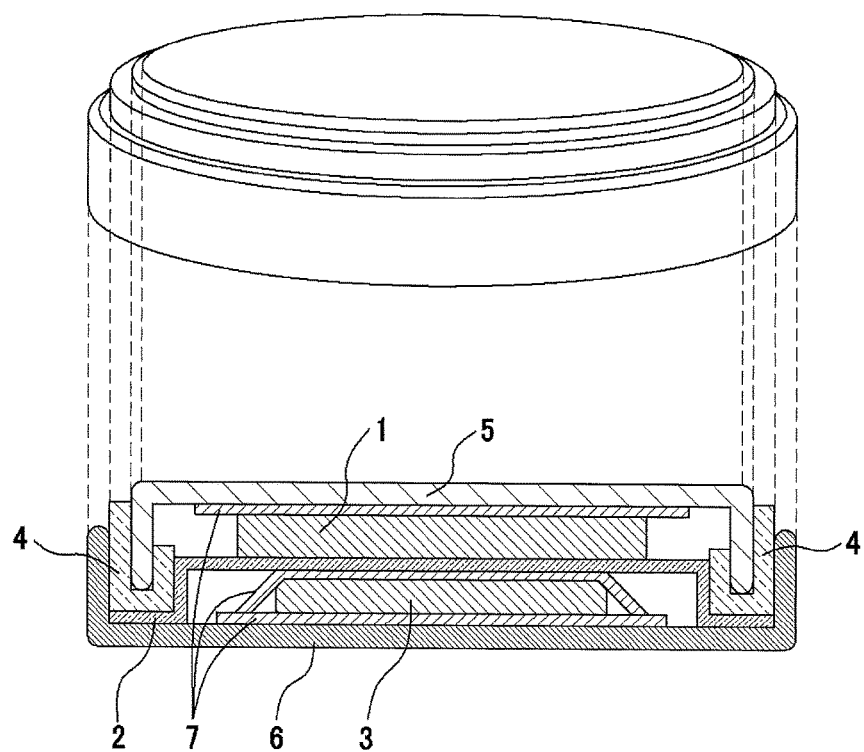
FIG. 3 shows a schematic view and a sectional view of a coin battery used to evaluate a positive electrode active material obtained in each of examples and comparative examples.

In Example 1, 70 mass % of a powder of the positive electrode active material was mixed with 20 mass % of acetylene black and 10 mass % of PTFE (polytetrafluoroethylene) to obtain a mixture, and then 150 mg of the mixture was used to form a pellet as a positive electrode. In Example 1, lithium metal was used as a negative electrode, and a mixture solution of equal parts of ethylene carbonate (EC) and diethyl carbonate (DEC) containing 1 M of $LiClO_4$ as a supporting salt (manufactured by TOMIYAMA PURE CHEMICAL INDUSTRIES, Ltd.) was used as an electrolyte. Then, in Example 1, a 2032-type coin battery such as one shown in FIG. 3 was produced using the obtained positive electrode, the negative electrode, and the mixture solution of equal parts of EC and DEC in a glove box having an Ar atmosphere whose dew point was controlled at −80° C.

Then, in Example 1, the produced coin battery was allowed to stand for about 24 hours. After the open circuit voltage (OCV) of the battery was stabilized, the battery was charged to a cutoff voltage of 4.3 V at a current density for positive electrode of 0.5 mA/cm² to determine an initial charge capacity. After a rest of 1 hour, the battery was discharged to a cutoff voltage of 3.0 V, and the discharge capacity at this time was defined as an initial discharge capacity.

It is to be noted that, in Example 1, the reaction conditions, the ratio of sodium to aluminum in sodium aluminate, and the composition and particle size distribution of the obtained nickel cobalt aluminum composite hydroxide are shown in Table 1, and the composition of the obtained positive electrode active material, the initial discharge capacity, a discharge capacity after 200 cycles, and a maximum exothermic peak height obtained by DSC measurement are shown in Table 2. Further, Examples 2 to 11 and Comparative Examples 1 to 10 that will be described later were also summarized as in the case of Example 1.

Example 2

In Example 2, a nickel cobalt aluminum composite hydroxide and a positive electrode active material using the nickel cobalt aluminum composite hydroxide as a raw material were obtained and evaluated in the same manner as in Example 1 except that when the aqueous sodium aluminate solution was prepared, a 25% aqueous sodium hydroxide solution was added so that the ratio of sodium to aluminum was 2.7. The evaluation results are summarized in Tables 1 and 2.

Example 3

In Example 3, a nickel cobalt aluminum composite hydroxide and a positive electrode active material using the nickel cobalt aluminum composite hydroxide as a raw material were obtained and evaluated in the same manner as in Example 1 except that the nucleation pH in the nucleation step was 13.2. The evaluation results are summarized in Tables 1 and 2.

Example 4

In Example 4, a nickel cobalt aluminum composite hydroxide and a positive electrode active material using the nickel cobalt aluminum composite hydroxide as a raw material were obtained and evaluated in the same manner as in Example 1 except that the particle growth pH in the particle growth step was 10.8. The evaluation results are summarized in Tables 1 and 2.

Example 5

In Example 5, a nickel cobalt aluminum composite hydroxide and a positive electrode active material using the nickel cobalt aluminum composite hydroxide as a raw material were obtained and evaluated in the same manner as in Example 1 except that in the process of producing a composite hydroxide, the reaction aqueous solution for crystallization was prepared so that the mole ratio among the metal elements was Ni:Co:Al=0.69:0.13:0.18. The evaluation results are summarized in Tables 1 and 2.

Example 6

In Example 6, a nickel cobalt aluminum composite hydroxide and a positive electrode active material using the nickel cobalt aluminum composite hydroxide as a raw material were obtained acid evaluated in the same manner as in Example 1 except that the temperature in the vessel was set to 30° C. The evaluation results are summarized in Tables 1 and 2.

Example 7

In Example 7, a nickel cobalt aluminum composite hydroxide and a positive electrode active material using the nickel cobalt aluminum composite hydroxide as a raw material were obtained and evaluated in the same manner as in Example 1 except that in the process of producing a composite hydroxide, the concentration of ammonium ions was 20 g/L. The evaluation results are summarized in Tables 1 and 2.

Example 8

In Example 8, a nickel cobalt aluminum composite hydroxide and a positive electrode active material using the nickel cobalt aluminum composite hydroxide as a raw material were obtained and evaluated in the same manner as in Example 1 except that in the process of producing a positive electrode active material, the calcining temperature was 820° C. The evaluation results are summarized in Tables 1 and 2.

Example 9

In Example 9, a nickel cobalt aluminum composite hydroxide and a positive electrode active material using the nickel cobalt aluminum composite hydroxide as a raw material were obtained and evaluated in the same manner as in Example 1 except that in the process of producing a positive electrode active material, the heat treatment temperature was 350° C. The evaluation results are summarized in Tables 1 and 2.

Example 10

In Example 10, a nickel cobalt aluminum composite hydroxide and a positive electrode active material using the nickel cobalt aluminum composite hydroxide as a raw material were obtained and evaluated in the same manner as in Example 1 except that in the process of producing a positive electrode active material, the heat treatment was omitted. The evaluation results are summarized in Tables 1 and 2.

Example 11

In Example 11 a nickel cobalt aluminum composite hydroxide and a positive electrode active material using the nickel cobalt aluminum composite hydroxide as a raw material were obtained and evaluated in the same manner as in Example 1 except that in the process of producing a positive electrode active material, the calcining temperature was 900° C. The evaluation results are summarized in Tables 1 and 2.

Comparative Example 1

In Comparative Example 1, a nickel cobalt aluminum composite hydroxide and a positive electrode active material using the nickel cobalt aluminum composite hydroxide as a raw material were obtained and evaluated in the same manner as in Example 1 except that when the aqueous sodium aluminate solution was prepared, a 25% aqueous sodium hydroxide solution was added so that the ratio of sodium to aluminum was 1.0. The evaluation results are summarized in Tables 1 and 2.

Comparative Example 2

In Comparative Example 2, a nickel cobalt aluminum composite hydroxide and a positive electrode active material using the nickel cobalt aluminum composite hydroxide as a raw material were obtained and evaluated in the same manner as in Example 1 except that when the aqueous sodium aluminate solution was prepared, a 25% aqueous sodium hydroxide solution was added so that the ratio of sodium to aluminum was 3.5. The evaluation results e summarized in Tables 1 and 2.

Comparative Example 3

In Comparative Example 3, a nickel cobalt aluminum composite hydroxide and a positive electrode active material using the nickel cobalt aluminum composite hydroxide as a raw material were obtained and evaluated in the same manner as in Example 1 except that the nucleation pH in the nucleation step was 13.6. The evaluation results are summarized in Tables 1 and 2.

Comparative Example 4

In Comparative Example 4, a nickel cobalt aluminum composite hydroxide and a positive electrode active material using the nickel cobalt aluminum composite hydroxide as a raw material were obtained and evaluated in the same manner as in Example 1 except that the nucleation pH in the nucleation step was 11.8. The evaluation results are summarized in Tables 1 and 2.

Comparative Example 5

In Comparative Example 5, a nickel cobalt aluminum composite hydroxide and a positive electrode active material using the nickel cobalt aluminum composite hydroxide as a raw material were obtained and evaluated in the same manner as in Example 1 except that the particle growth pH in the particle growth step was 12.2. The evaluation results are summarized in Tables 1 and 2.

Comparative Example 6

In Comparative Example 6, a nickel cobalt aluminum composite hydroxide and a positive electrode active material using the nickel cobalt aluminum composite hydroxide as a raw material were obtained and evaluated in the same manner as in Example 1 except that the particle growth pH in the particle growth step was 10.3. The evaluation results are summarized in Tables 1 and 2.

Comparative Example 7

In Comparative Example 7, a nickel cobalt aluminum composite hydroxide and a positive electrode active material using the nickel cobalt aluminum composite hydroxide as a raw material were obtained and evaluated in the same manner as in Example 1 except that in the process of producing a composite hydroxide, the reaction aqueous solution for crystallization was prepared so that the mole ratio among the metal elements was Ni:Co:Al=0.82:0.15:0.03. The evaluation results are summarized in Tables 1 and 2.

Comparative Example 8

In Comparative Example 8, a nickel cobalt aluminum composite hydroxide and a positive electrode active material using the nickel cobalt aluminum composite hydroxide as a raw material were obtained and evaluated in the same manner as in Example 1 except that in the process of producing a composite hydroxide, the reaction aqueous solution for crystallization was prepared so that the mole ratio among the metal elements was Ni:Co:Al=0.65:0.12:0.23. The evaluation results are summarized in Tables 1 and 2.

Comparative Example 9

In Comparative Example 9, a nickel cobalt aluminum composite hydroxide and a positive electrode active material using the nickel cobalt aluminum composite hydroxide as a raw material were obtained and evaluated in the same manner as in Example 1 except that in the process of producing a composite hydroxide, an aqueous ammonia solution was not added. The evaluation results are summarized in Tables 1 and 2.

Comparative Example 10

In Comparative Example 10, a nickel cobalt aluminum composite hydroxide and a positive electrode active material using the nickel cobalt aluminum composite hydroxide as a raw material were obtained and evaluated in the same manner as in Example 1 except that in the process of producing a composite hydroxide, a 0.1 mol/L aqueous aluminum sulfate solution was used as an aluminum source instead of the aqueous sodium aluminate solution. The evaluation results are summarized in Tables 1 and 2.

TABLE 1

|  | Nucleation pH | Particle growth pH | Reaction temperature [° C.] | Concentration of $NH_3$ [g/L] | Na/Al | Ni:Co:Al | Average particle diameter [μm] | (D90-D10)/ average particle diameter |
|---|---|---|---|---|---|---|---|---|
| Example 1 | 12.6 | 11.6 | 50 | 10 | 1.7 | 76:14:10 | 6.9 | 0.48 |
| Example 2 | 12.6 | 11.6 | 50 | 10 | 2.7 | 76:14:10 | 7.1 | 0.47 |
| Example 3 | 13.2 | 11.6 | 50 | 10 | 1.7 | 76:14:10 | 5.6 | 0.48 |
| Example 4 | 12.6 | 10.8 | 50 | 10 | 1.7 | 76:14:10 | 6.9 | 0.48 |
| Example 5 | 12.6 | 11.6 | 50 | 10 | 1.7 | 69:13:18 | 6.1 | 0.49 |
| Example 6 | 12.6 | 11.6 | 30 | 10 | 1.7 | 76:14:10 | 4.9 | 0.49 |
| Example 7 | 12.6 | 11.6 | 50 | 20 | 1.7 | 76:14:10 | 7.3 | 0.48 |
| Example 8 | 12.6 | 11.6 | 50 | 10 | 1.7 | 76:14:10 | 6.9 | 0.48 |
| Example 9 | 12.6 | 11.6 | 50 | 10 | 1.7 | 76:14:10 | 6.9 | 0.48 |
| Example 10 | 12.6 | 11.6 | 50 | 10 | 1.7 | 76:14:10 | 6.9 | 0.48 |
| Example 11 | 12.6 | 11.6 | 50 | 10 | 1.7 | 76:14:10 | 6.9 | 0.48 |
| Comparative Example 1 | 12.6 | 11.6 | 50 | 10 | 1.0 | 76:14:10 | 7.0 | 0.53 |

TABLE 1-continued

|  | Nucleation pH | Particle growth pH | Reaction temperature [° C.] | Concentration of $NH_3$ [g/L] | Na/Al | Ni:Co:Al | Average particle diameter [μm] | (D90-D10)/ average particle diameter |
|---|---|---|---|---|---|---|---|---|
| Comparative Example 2 | 12.6 | 11.6 | 50 | 10 | 3.5 | 76:14:10 | 6.7 | 0.53 |
| Comparative Example 3 | 13.6 | 11.6 | 50 | 10 | 1.7 | 76:14:10 | 5.9 | 0.55 |
| Comparative Example 4 | 11.8 | 11.6 | 50 | 10 | 1.7 | 76:14:10 | 7.6 | 0.56 |
| Comparative Example 5 | 12.6 | 12.2 | 50 | 10 | 1.7 | 76:14:10 | 5.0 | 0.54 |
| Comparative Example 6 | 12.6 | 10.3 | 50 | 10 | 1.7 | 76:14:10 | 6.2 | 0.53 |
| Comparative Example 7 | 12.6 | 11.6 | 50 | 10 | 1.7 | 82:15:3 | 7.3 | 0.46 |
| Comparative Example 8 | 12.6 | 11.6 | 50 | 10 | 1.7 | 65:12:23 | 5.9 | 0.52 |
| Comparative Example 9 | 12.6 | 11.6 | 50 | 0 | 1.7 | 76:14:10 | 3.5 | 0.67 |
| Comparative Example 10 | 12.6 | 11.6 | 50 | 10 | — | 76:14:10 | 3.3 | 0.77 |

TABLE 2

|  | Composition | Initial discharge capacity [mAh/g] | Discharge capacity after 200 cycles | Maximum exothermic peak height [cal/sec/g] | Average particle diameter [μm] | (D90-D10)/ average particle diameter |
|---|---|---|---|---|---|---|
| Example 1 | $Li_{1.016}Ni_{0.78}Co_{0.14}Al_{0.10}O_2$ | 185 | 97 | 1.4 | 6.4 | 0.47 |
| Example 2 | $Li_{1.018}Ni_{0.78}Co_{0.14}Al_{0.10}O_2$ | 183 | 96 | 1.4 | 6.8 | 0.47 |
| Example 3 | $Li_{1.018}Ni_{0.76}Co_{0.14}Al_{0.10}O_2$ | 186 | 97 | 1.5 | 5.4 | 0.48 |
| Example 4 | $Li_{1.019}Ni_{0.76}Co_{0.14}Al_{0.10}O_2$ | 184 | 97 | 1.4 | 6.1 | 0.46 |
| Example 5 | $Li_{1.018}Ni_{0.69}Co_{0.13}Al_{0.18}O_2$ | 167 | 98 | 1.0 | 5.9 | 0.49 |
| Example 6 | $Li_{1.020}Ni_{0.70}Co_{0.14}Al_{0.10}O_2$ | 188 | 95 | 1.5 | 4.6 | 0.50 |
| Example 7 | $Li_{1.019}Ni_{0.70}Co_{0.14}Al_{0.10}O_2$ | 183 | 96 | 1.3 | 7.0 | 0.47 |
| Example 8 | $Li_{1.017}Ni_{0.76}Co_{0.14}Al_{0.10}O_2$ | 179 | 94 | 1.5 | 7.1 | 0.50 |
| Example 9 | $Li_{1.018}Ni_{0.76}Co_{0.14}Al_{0.10}O_2$ | 184 | 97 | 1.4 | 6.4 | 0.47 |
| Example 10 | $Li_{1.008}Ni_{0.76}Co_{0.14}Al_{0.10}O_2$ | 182 | 94 | 1.6 | 6.3 | 0.47 |
| Example 11 | $Li_{1.019}Ni_{0.76}Co_{0.14}Al_{0.10}O_2$ | 183 | 95 | 1.6 | 6.6 | 0.50 |
| Comparative Example 1 | $Li_{1.017}Ni_{0.76}Co_{0.14}Al_{0.10}O_2$ | 183 | 88 | 1.7 | 6.7 | 0.57 |
| Comparative Example 2 | $Li_{1.018}Ni_{0.76}Co_{0.14}Al_{0.10}O_2$ | 182 | 89 | 1.8 | 6.6 | 0.56 |
| Comparative Example 3 | $Li_{1.020}Ni_{0.78}Co_{0.14}Al_{0.10}O_2$ | 183 | 88 | 1.7 | 6.0 | 0.57 |
| Comparative Example 4 | $Li_{1.017}Ni_{0.78}Co_{0.14}Al_{0.10}O_2$ | 181 | 87 | 1.7 | 7.6 | 0.57 |
| Comparative Example 5 | $Li_{1.018}Ni_{0.78}Co_{0.14}Al_{0.10}O_2$ | 182 | 88 | 1.6 | 5.6 | 0.58 |
| Comparative Example 6 | $Li_{1.019}Ni_{0.78}Co_{0.14}Al_{0.10}O_2$ | 178 | 86 | 1.8 | 7.0 | 0.58 |
| Comparative Example 7 | $Li_{1.016}Ni_{0.82}Co_{0.15}Al_{0.03}O_2$ | 195 | 87 | 2.1 | 7.0 | 0.49 |
| Comparative Example 8 | $Li1._{016}Ni_{0.85}Co_{0.12}Al_{0.23}O_2$ | 152 | 78 | 0.5 | 5.8 | 0.52 |
| Comparative Example 9 | $Li_{1.018}Ni_{0.76}Co_{0.14}Al_{0.10}O_2$ | 181 | 84 | 1.7 | 5.3 | 0.76 |
| Comparative Example 10 | $Li_{1.019}Ni_{0.76}Co_{0.14}Al_{0.10}O_2$ | 184 | 87 | 1.8 | 3.8 | 0.80 |

(Evaluation)

The average particle diameter and the value of [(D90-D10)/average particle diameter], which is an index indicating the dispersion of particle size distribution, of each of the nickel cobalt aluminum composite hydroxides and the positive electrode active materials obtained in Examples 1 to 11 were within preferred ranges, and therefore the particles had an excellent particle diameter distribution and a substantially uniform particle diameter. The coin-type batteries using these positive electrode active materials, respectively, had a high initial discharge capacity, an excellent cycle characteristic, a high level of safety, and an excellent battery characteristic.

On the other hand, the nickel cobalt aluminum composite hydroxides and the positive electrode active materials obtained in Comparative Examples 1 and 2 had a wide particle size distribution, because the ratio of sodium to aluminum in sodium aluminate was not within a preferred range, and therefore nickel, cobalt, and aluminum were not homogeneously coprecipitated so that fine particles or aggregated particles were formed. Further, the coin batteries produced using the positive electrode active materials obtained in Comparative Examples 1 and 2, respectively, were poor in cycle characteristic, because the fine positive electrode active material had a large surface area, and therefore a battery reaction preferentially occurred so that the positive electrode active material was rapidly degraded.

The nickel cobalt aluminum composite hydroxide and the positive electrode active material obtained in Comparative Example 3 had a wide particle size distribution, because the pH of the nucleation step was higher than 13.4, and therefore the reaction aqueous solution was gelled. Further, the coin battery produced using the positive electrode active material obtained in Comparative Example 3 was poor in cycle characteristic as in the case of the Comparative Examples 1 and 2.

The nickel cobalt aluminum composite hydroxide and the positive electrode active material obtained in Comparative Example 4 had a wide particle size distribution, because the pH of the nucleation step is lower than 12.0, and therefore a nucleus growth reaction occurred together with nucleation so that nuclei having a wide particle size distribution were formed. Further, the coin battery produced using the positive electrode active material obtained in Comparative Example 4 was poor in cycle characteristic as in the case of the Comparative Examples 1 and 2.

The nickel cobalt aluminum composite hydroxide and the positive electrode active material obtained in Comparative Example 5 had a wide particle size distribution, because the pH of the particle growth step was higher than 12.0, and therefore new nuclei were formed in the particle growth step. Further, the coin battery produced using the positive electrode active material obtained in Comparative Example 5 was poor in cycle characteristic as in the case of the Comparative Examples 1 and 2.

The nickel cobalt aluminum composite hydroxide and the positive electrode active material obtained in Comparative Example 6 had a wide particle size distribution, because the pH of the particle growth step was lower than 10.5, and therefore coprecipitation of nickel and cobalt was less likely to occur so that nickel and cobalt were each precipitated singly. Further, the coin battery produced using the positive electrode active material obtained in Comparative Example 6 was poor in cycle characteristic as in the case of the Comparative Examples 1 and 2.

The coin battery produced using the positive electrode active material obtained using the nickel cobalt aluminum composite hydroxide obtained in Comparative Example 7 had a low cycle characteristic and a low level of safety, because the atomic ratio of aluminum with respect to all the metal atoms other than lithium in the positive electrode active material was lower than 0.1.

The coin battery produced using the positive electrode active material obtained using the nickel cobalt aluminum composite hydroxide obtained in Comparative Example 8 was significantly poor in discharge capacity and cycle characteristic, because the atomic ratio of aluminum with respect to all the metal atoms other than lithium in the positive electrode active material was higher than 0.20, and therefore the layered structure could not be maintained.

The nickel cobalt aluminum composite hydroxide and the positive electrode active material obtained in Comparative Example 9 had a wide particle size distribution, because ammonia water was not added, and therefore the solubility of the composite hydroxide was reduced so that new nuclei were formed in the particle growth step. Further, the coin battery produced using the positive electrode active material obtained in Comparative Example 9 was poor in cycle characteristic as in the case of the Comparative Examples 1 and 2.

The nickel cobalt aluminum composite hydroxide and the positive electrode active material obtained in Comparative Example 10 had a wide particle size distribution, because an aqueous aluminum sulfate solution was used as an aluminum source, and therefore aluminum hydroxide was precipitated singly. Further, the coin battery produced using the positive electrode active material obtained in Comparative Example 10 was poor in cycle characteristic as in the case of the Comparative Examples 1 and 2.

From the above results, it was confirmed that when a nickel cobalt aluminum composite hydroxide and a positive electrode active material were produced by any one of the production processes of Examples 1 to 11, a non-aqueous electrolyte secondary battery using such a positive electrode active material had a high initial discharge capacity, an excellent cycle characteristic, a high level of safety, and an excellent battery characteristic.

The use of the positive electrode active material according to the present invention as a material of a non-aqueous electrolyte secondary battery makes it possible to obtain a compact and high-power non-aqueous electrolyte secondary battery having an excellent cycle characteristic and a high level of safety. Therefore, the positive electrode active material according to the present invention is suitable as a material of a battery for electric cars with a limited mounting space.

It is to be noted that the positive electrode active material according to the present invention is used also as a battery material not only for electric cars driven only by electric energy but also for so-called hybrid cars that also use a combustion engine such as a gasoline engine or a diesel engine.

GLOSSARY OF DRAWING REFERENCES

1 . . . lithium metal negative electrode, 2 . . . separator (electrolytic solution impregnation), 3 . . . positive electrode (electrode for evaluation), 4 . . . gasket, 5 . . . negative electrode can, 6 . . . positive electrode can, 7 . . . current collector

The invention claimed is:
1. A process for producing a nickel cobalt aluminum composite hydroxide by a crystallization reaction,
the nickel cobalt aluminum composite hydroxide being represented by a general formula 1: $Ni_{1-x-y}Co_xAl_y(OH)_{2+\alpha}$ (wherein $0<x\leq0.3$, $0.1\leq y\leq0.2$, $x+y<0.5$, $0\leq\alpha\leq0.5$),
the process comprising:
a nucleation step in which nucleation is performed by controlling an aqueous solution for nucleation containing a nickel-containing metal compound, a cobalt-containing metal compound, an ammonium ion supplier, and an aluminum source such that a pH of the aqueous solution for nucleation is 12.0 to 13.4 as a pH measured on a basis of a liquid temperature of 25° C.; and
a particle growth step in which particle growth is performed in an aqueous solution for particle growth obtained by controlling the aqueous solution for nucleation obtained in the nucleation step such that a pH of the aqueous solution for particle growth is 10.5 to 12.0 as a pH measured on a basis of a liquid temperature of 25° C., wherein, in the nucleation step, an aqueous solution containing aluminum and sodium is used as the aluminum source contained in the aqueous solution for nucleation, and a mole ratio of sodium to aluminum in the aqueous solution containing aluminum and sodium is adjusted to 1.5 to 3.0.

2. The process for producing a nickel cobalt aluminum composite hydroxide according to claim 1, wherein the aqueous solution containing aluminum and sodium is an aqueous sodium aluminate solution.

3. The process for producing a nickel cobalt aluminum composite hydroxide according to claim 1, wherein in the nucleation step and the particle growth step, a reaction temperature is maintained at 20° C. or higher.

4. The process for producing a nickel cobalt aluminum composite hydroxide according to claim 1, wherein in the nucleation step and the particle growth step, concentrations of ammonium ions in the aqueous solution for nucleation and the aqueous solution for particle growth are maintained in a range of 3 g/L to 25 g/L.

5. A process for producing a positive electrode active material for non-aqueous electrolyte secondary batteries, which comprises a lithium nickel cobalt aluminum composite oxide, from a nickel cobalt aluminum composite hydroxide and/or a nickel cobalt aluminum composite oxide, the nickel cobalt aluminum composite hydroxide being represented by a general formula 1: $Ni_{1-x-y}Co_xAl_y(OH)_{2+\alpha}$ (wherein $0<x\leq0.3$, $0.1\leq y\leq0.2$, $x+y<0.5$, $0\leq\alpha\leq0.5$), and the lithium nickel cobalt aluminum composite oxide comprising a hexagonal lithium-containing composite oxide having a layered structure and being represented by a general formula 2: $Li_tNi_{1-x-y}Co_xAl_yO_2$ (wherein $0.95\leq t\leq1.15$, $0<x\leq0.3$, $0.1\leq y\leq0.2$, $x+y<0.5$), the process comprising:
a nucleation step in which nucleation is performed by controlling an aqueous solution for nucleation containing a nickel-containing metal compound, a cobalt-containing metal compound, an ammonium ion supplier, and an aluminum source such that a pH of the aqueous solution for nucleation is 12.0 to 13.4 as a pH measured on a basis of a liquid temperature of 25° C.;
a particle growth step in which particle growth is performed in an aqueous solution for particle growth obtained by controlling the aqueous solution for nucleation obtained in the nucleation step such that a pH of the aqueous solution for particle growth is 10.5 to 12.0 as a pH measured on a basis of a liquid temperature of 25° C.;
a mixing step in which a mixture is formed by mixing a lithium compound with the nickel cobalt aluminum composite hydroxide and/or the nickel cobalt aluminum composite oxide obtained by heat-treating a nickel cobalt aluminum composite hydroxide in an oxidizing atmosphere; and
a calcining step in which the mixture obtained in the mixing step is calcined,
wherein in the nucleation step, an aqueous solution containing aluminum and sodium is used as the aluminum source contained in the aqueous solution for nucleation, and a mole ratio of sodium to aluminum in the aqueous solution containing aluminum and sodium is adjusted to 1.5 to 3.0.

6. The process for producing a positive electrode active material for non-aqueous electrolyte secondary batteries according to claim 5, wherein in the calcining step, the mixture obtained in the mixing step is calcined at a temperature of 700° C. to 950° C.

* * * * *